(12) United States Patent
Linsky et al.

(10) Patent No.: US 9,788,288 B2
(45) Date of Patent: Oct. 10, 2017

(54) SYSTEMS AND METHODS FOR REDUCING POWER CONSUMPTION IN WIRELESS COMMUNICATION

(71) Applicant: QUALCOMM Incorporated, San Diego, CA (US)

(72) Inventors: Joel Benjamin Linsky, San Diego, CA (US); Brian Arnold Redding, Urbana, IL (US)

(73) Assignee: QUALCOMM Incorporated, San Diego, CA (US)

(*) Notice: Subject to any disclaimer, the term of this patent is extended or adjusted under 35 U.S.C. 154(b) by 194 days.

(21) Appl. No.: 14/153,945

(22) Filed: Jan. 13, 2014

(65) Prior Publication Data
US 2015/0201389 A1    Jul. 16, 2015

(51) Int. Cl.
| | |
|---|---|
| *H04W 52/48* | (2009.01) |
| *H04W 4/00* | (2009.01) |
| *H04W 52/02* | (2009.01) |
| *H04W 56/00* | (2009.01) |
| *H04W 76/04* | (2009.01) |
| *H04W 84/20* | (2009.01) |

(52) U.S. Cl.
CPC ........... *H04W 52/48* (2013.01); *H04W 4/008* (2013.01); *H04W 52/0212* (2013.01); *H04W 56/0015* (2013.01); *H04W 76/048* (2013.01); *H04W 84/20* (2013.01); *Y02B 60/50* (2013.01)

(58) Field of Classification Search
CPC . H04W 52/00; H04W 84/18; H04W 52/0209; H04W 56/0045; H04W 4/008; H04W 84/20; H04W 52/48; H04W 52/0212; H04W 76/048; H04W 56/0015; H04W 52/209; H04W 52/50; H04W 74/04; H04W 74/06; H04W 88/06; H04W 8/005; H04L 1/0053; H04L 12/4035; H04J 3/06; H04J 3/0635; H04J 3/0638; Y02B 60/50
See application file for complete search history.

(56) References Cited

U.S. PATENT DOCUMENTS

| | | |
|---|---|---|
| 6,570,857 B1 | 5/2003 | Haartsen et al. |
| 7,564,832 B2 | 7/2009 | Parys et al. |
| 7,653,017 B2 | 1/2010 | Huylebroeck |
| 2010/0091644 A1 | 4/2010 | Chen |

(Continued)

FOREIGN PATENT DOCUMENTS

WO    WO-2013038146 A1    3/2013

OTHER PUBLICATIONS

International Search Report and Written Opinion—PCT/US2015/010646—ISA/EPO—Mar. 24, 2015.

(Continued)

*Primary Examiner* — Charles C Jiang
*Assistant Examiner* — Rose Clark
(74) *Attorney, Agent, or Firm* — Austin Rapp (57) ABSTRACT

A method for reducing power consumption is described. The method includes negotiating a receive window of a slave wireless device. The method also includes exchanging timing uncertainty information relating to a clock of the slave wireless device and a clock of the master wireless device. The method further includes transmitting a packet multiple times on a same frequency based on the receive window and the timing uncertainty information.

24 Claims, 8 Drawing Sheets

(56) References Cited

U.S. PATENT DOCUMENTS

| | | | |
|---|---|---|---|
| 2010/0112950 A1* | 5/2010 | Haartsen | H04B 5/0056 455/41.3 |
| 2010/0214942 A1* | 8/2010 | Du | H04L 43/0876 370/252 |
| 2011/0021142 A1* | 1/2011 | Desai | H04W 8/005 455/41.2 |
| 2011/0026512 A1* | 2/2011 | Wenham | H04W 72/1215 370/345 |
| 2011/0150252 A1* | 6/2011 | Solum | H04R 25/55 381/314 |
| 2011/0150254 A1* | 6/2011 | Solum | H04R 25/554 381/314 |
| 2011/0255454 A1* | 10/2011 | Hauser | H04W 88/04 370/311 |
| 2012/0119902 A1* | 5/2012 | Patro | H04L 12/12 340/502 |
| 2012/0124444 A1* | 5/2012 | Husted | H04W 52/0216 714/748 |
| 2013/0003715 A1* | 1/2013 | Xhafa | H04W 52/0229 370/349 |
| 2013/0235166 A1 | 9/2013 | Jones et al. | |
| 2014/0068719 A1* | 3/2014 | Kiukkonen | H04W 12/08 726/4 |
| 2014/0206286 A1* | 7/2014 | Palin | H04W 8/005 455/41.2 |
| 2014/0321321 A1* | 10/2014 | Knaappila | H04W 52/0209 370/254 |
| 2014/0355517 A1* | 12/2014 | Reunamaki | H04W 8/005 370/328 |
| 2015/0092642 A1* | 4/2015 | Geboff | H04W 4/008 370/311 |
| 2015/0121066 A1* | 4/2015 | Nix | H04W 52/0235 713/155 |

OTHER PUBLICATIONS

Bluetooth, "Specification of the Bluetooth System", Covered Core Package version: 4.0, Jun. 30, 2010, vol. (0-6), pp. 1-2302.

\* cited by examiner

SYSTEMS AND METHODS FOR REDUCING POWER CONSUMPTION IN WIRELESS COMMUNICATION

TECHNICAL FIELD

The present disclosure relates generally to wireless communications. More specifically, the present disclosure relates to systems and methods for reducing power consumption in wireless communication.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices may make use of different communication technologies. For example, a wireless device may communicate with one or more wireless devices. Each wireless device may utilize a clock during communication. However, the clocks may have inherent timing uncertainties. Benefits may be realized by reducing power consumption during timing uncertainty compensation.

SUMMARY

A method for reducing power consumption is described. The method includes negotiating a receive window of a slave wireless device. The method also includes exchanging timing uncertainty information relating to a clock of the slave wireless device and a clock of the master wireless device. The method further includes transmitting a packet multiple times on a same frequency based on the receive window and the timing uncertainty information.

The packet may be a Bluetooth Low Energy packet. The method may be performed by the master wireless device. The master wireless device may operate in a time division duplex system with a polled multiple access scheme.

The timing uncertainty information may relate to clock drift of the slave wireless device and the master wireless device. The receive window may be the maximum time the slave wireless device must remain awake to receive at least one transmission of the packet.

The transmitting may include dynamically determining how many times to transmit the packet so that the slave wireless device will receive the packet at least once. The method may also include determining a number of packets to transmit based on the timing uncertainty information.

An apparatus for reducing power consumption is also described. The apparatus includes a processor, memory in electronic communication with the processor, and executable instructions stored in the memory. The apparatus negotiates a receive window of a slave wireless device. The apparatus exchanges timing uncertainty information relating to a clock of the slave wireless device and a clock of the master wireless device. The apparatus transmits a packet multiple times on a same frequency based on the receive window and the timing uncertainty information.

A wireless device for reducing power consumption is also described. The wireless device includes means for negotiating a receive window of a slave wireless device. The wireless device also includes means for exchanging timing uncertainty information relating to a clock of the slave wireless device and a clock of the master wireless device. The wireless device further includes means for transmitting a packet multiple times on a same frequency based on the receive window and the timing uncertainty information.

A computer-program product for reducing power consumption is also described. The computer-program product includes a non-transitory computer-readable medium having instructions thereon. The instructions include code for causing a master wireless device to negotiate a receive window of a slave wireless device. The instructions also include code for causing the master wireless device to exchange timing uncertainty information relating to a clock of the slave wireless device and a clock of the master wireless device. The instructions further include code for causing the master wireless device to transmit a packet multiple times on a same frequency based on the receive window and the timing uncertainty information.

DETAILED DESCRIPTION

The systems and methods disclosed herein may be applied to communication devices that communicate wirelessly and/or that communicate using a wired connection or link. It should be noted that some communication devices may communicate wirelessly and/or may communicate using a wired connection or link. For example, some communication devices may communicate with other devices using an Ethernet protocol. In one configuration, the systems and methods disclosed herein may be applied to a communication device that communicates with another device using a polled multiple access communication technology. One implementation of a polled multiple access communication technology is Bluetooth.

The current Bluetooth low energy specification (v4.0) has a power consumption bias in favor of the master wireless device. The master wireless device simply transmits once at its nominal timing, whereas the slave wireless device has to open a large receive window. This is due to the slave wireless device having to compensate for the total clock uncertainty (e.g., the combined timing uncertainty of the master wireless device and slave wireless device) when configuring the width of its receive window. However, this may result in undesirable power consumption by the slave wireless device.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
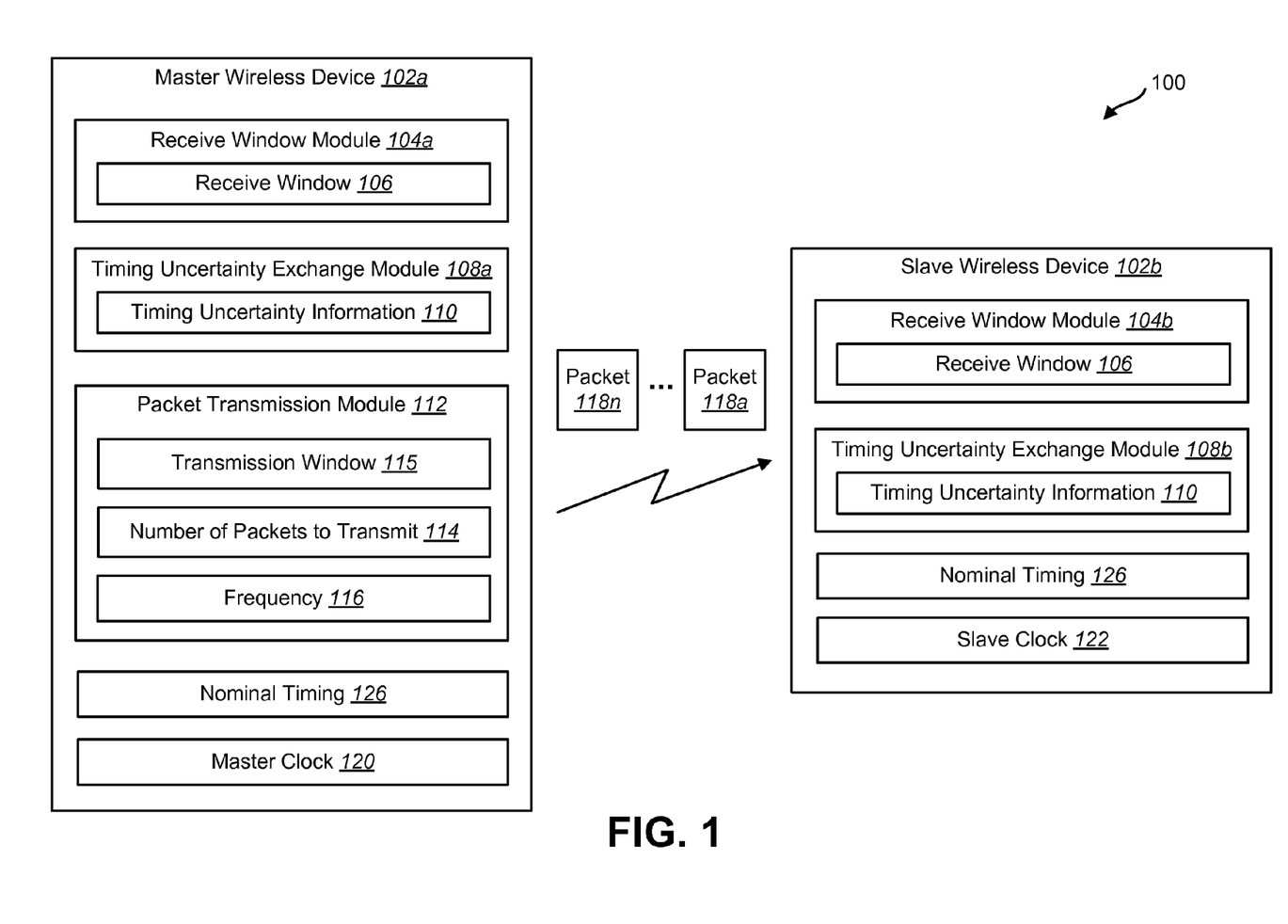
FIG. 1 is a block diagram illustrating one configuration of a master wireless device and a slave wireless device in which systems and methods for reducing power consumption may be implemented.

FIG. 1 is a block diagram illustrating one configuration of a master wireless device 102a and a slave wireless device 102b in which systems and methods for reducing power consumption may be implemented. Wireless communication systems are widely deployed to provide various types of communication content such as voice, data, and so on.

The wireless communication system 100 may be a multiple-access system capable of supporting communication with multiple wireless devices 102 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

A wireless device 102 may also be referred to as a wireless communication device, a mobile device, mobile station, subscriber station, client, client station, user equipment (UE), remote station, access terminal, mobile terminal, terminal, user terminal, subscriber unit, etc. Examples of wireless devices 102 include laptop or desktop computers, cellular phones, smart phones, wireless modems, e-readers, tablet devices, gaming systems, etc. Some of these devices may operate in accordance with one or more industry standards.

Communications in a wireless system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

Communications in a wireless system may also be achieved based on a master polled system. The master polled system may utilize time-division duplexing (TDD) in which a master wireless device 102a may send a packet 118 to a slave wireless device 102b. In a master polled system, the master wireless device 102a sending the packet 118 gives the slave wireless device 102b the ability to transmit back.

One example of wireless communication using a master polled system is the Bluetooth wireless technology standard. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets 118 and each packet 118 is transmitted on a designated Bluetooth frequency (e.g., channel).

In Bluetooth, one master wireless device 102a may communicate with one or more slave wireless device 102b. The master wireless device 102a may also be referred to simply as "master" and the slave wireless device 102b may also be referred to as "slave." The network of master wireless device 102a and one or more slave wireless device 102b may be referred to as a piconet. The wireless devices 102 may switch roles, by agreement. For example, a slave wireless device 102b may become the master wireless device 102a. Similarly, the master wireless device 102a may become a slave wireless device 102b.

The transmission of packets 118 in Bluetooth is based on a master clock 120. The slave wireless device 102b may share master clock 120. In other words, the master wireless device 102a may be in charge of timing and the slave clock 122 may be synchronized with the master clock 120. In one configuration, two clock ticks may form a slot. The wireless devices 102 may transmit a packet 118 in one slot and receive packets 118 in another slot.

When a wireless device 102 is not in an active state (e.g., awake state), the wireless device 102 (either the master wireless device 102a, the slave wireless device 102b or both) may enter a low duty cycle mode of operation. The low duty cycle mode of operation may also be referred to as a sleep state. While operating in a low duty cycle mode, the master wireless device 102a and the slave wireless device 102b may suspend transmission and reception to conserve energy. In order to maintain synchronization, the master wireless device 102a and the slave wireless device 102b may periodically communicate briefly. These periodic communications may be referred to as low energy connection events.

In a known approach (e.g., the Bluetooth Low Energy specification (v4.0)), low duty cycle communication may utilize a conventional sniff procedure. In the conventional sniff procedure, the master wireless device 102a and the slave wireless device 102b may negotiate that they will be absent for a certain amount of time. During this negotiation, the master wireless device 102a and the slave wireless device 102b may establish nominal timing 126, which may be a designated time that the master wireless device 102a may transmit a packet 118 to the slave wireless device 102b. Furthermore, at the designated time, the slave wireless device 102b may wake and receive the packet 118.

A clock that includes a crystal oscillator (including the master clock 120 and the slave clock 122), has inherent timing uncertainties. These uncertainties may be a result of manufacturing, materials, temperature fluctuations, etc. The clock may be rated in terms of parts per million (ppm) of drift. Therefore, the amount of timing uncertainty for a particular clock may be a known value. For example, a 32 kHz clock may have a timing uncertainty of plus/minus 250 ppm. Knowing the timing uncertainty information 110 of a clock, a wireless device 102 may compensate for the clock drift.

If the master wireless device 102a and the slave wireless device 102b are out of contact (during a low duty cycle, for instance), the amount of timing uncertainty for the two devices 102 may be calculated to determine when to transmit and receive a packet 118. According to the known solution, the master wireless device 102a may transmit the packet 118 based on the nominal timing 126. However, due to timing uncertainty of the master clock 120, the actual transmission of the packet 118 may occur before or after the nominal timing 126. Similarly, the slave wireless device 102b may expect to receive the packet 118 based on the nominal timing 126, but due to the timing uncertainty of the slave clock 122, the actual reception of the packet 118 may occur before or after the nominal timing 126.

According to the known approach, to accommodate for the timing uncertainty the slave wireless device 102b may compensate for clock drift of both wireless devices 102. The slave wireless device 102b may receive timing uncertainty information 110a from the master wireless device 102a. Based on the timing uncertainty information 110a of the master wireless device 102a and the timing uncertainty information 110b of the slave wireless device 102b, the slave wireless device 102b may open a large receive window 106 to ensure that the slave wireless device 102b will receive the packet 118 when it is sent by the master wireless device 102a.

In one example, the wireless devices 102 are going to be out of contact for 1 second and both wireless devices 102 have a 32 kHz clock that have a timing uncertainty of plus/minus 250 ppm. The plus/minus 250 ppm uncertainty equates to approximately 500 microseconds of uncertainty. Therefore, the master clock 120 has a total uncertainty of 500 microseconds and the slave clock 122 has total uncertainty of 500 microseconds. The combined timing uncertainty of the master clock 120 and the slave clock 122 is 1 millisecond (ms) over the course of 1 second.

According to the known approach, the slave wireless device 102b opens a wider receive window 106 to compensate for the combined timing uncertainty of the master clock 120 and the slave clock 122. The slave wireless device 102b will start listening for the packet 118 early (e.g., before the master wireless device 102a sends the packet 118). The slave wireless device 102b will then continue to listen for the packet 118 because the slave wireless device 102b does not know precisely when the packet 118 will be sent relative to the nominal timing 126.

The consequence for compensating for timing uncertainty by the slave wireless device 102b is power consumption by the slave wireless device 102b. According to the known solution, the slave wireless device 102b opens a wide receive window 106 and must stay active during this time to ensure that it receives the packet 118 from the master wireless device 102a. The fact that the slave wireless device 102b opens up this wider receive window 106 means the slave wireless device 102b consumes more power to listen for the reception than if the timing were perfect. Furthermore, the amount of power consumption that the slave wireless device 102b has to expend in order to compensate for timing uncertainty scales linearly with the amount of timing uncertainty. For example, if timing uncertainty of the master clock 120 and the slave clock 122 is +/−500 ppm, for each second that the master wireless device 102a and the slave wireless device 102b are out of contact, the slave wireless device 102b would have to open up a receive window 106 of nearly 2 ms. In other words, according to the known solution, as timing uncertainty increases or the time between packet 118 transmission increases, the power consumption of the slave wireless device 102b also increases.

The described systems and methods may reduce the power consumption of the slave wireless device 102b by transferring the timing uncertainty compensation to the master wireless device 102a. It may be desirable to switch the timing uncertainty compensation from slave wireless device 102b to the master wireless device 102a. In some circumstances, the master wireless device 102a may have a large power supply compared to the slave wireless device 102b. For example, if the wireless devices 102 are operating according to Bluetooth low energy standards, the master wireless device 102a may be a laptop computer or a smartphone with a large rechargeable battery or the master wireless device 102a may be desktop computer that has a continuous power supply. On the other hand, the slave wireless device 102b may be a sensor with a small non-rechargeable battery. In this case, the slave wireless device 102b may be intended to operate for multiple years on a single battery, whereas the master wireless device 102a may be frequently recharged. Therefore, it is desirable to minimize the power consumption in the slave wireless device 102b with a non-rechargeable battery source.

According to the described systems and methods, the master wireless device 102a may include a receive window module 104a. The slave wireless device 102b may also include a receive window module 104b. The master wireless device 102a and the slave wireless device 102b may negotiate the receive window 106 of the slave wireless device 102b. The receive window 106 may be determined based on the size of the packet 118 and the nominal timing 126. The receive window 106 of the slave wireless device 102b may be wide enough to receive the packet 118. The receive window 106 indicates when the slave wireless device 102b will wake up and how long the slave wireless device 102b will listen for a packet 118. The size of the receive window 106 may be large enough to ensure that the slave wireless device 102b receives a packet 118 transmission. Therefore, the receive window 106 may be the maximum time the slave wireless device 102b must remain awake to receive at least one transmission of the packet 118.

The receive window 106 may be capped at the negotiated size. As timing uncertainty (for the master wireless device 102a or the slave wireless device 102b) or the length of time between packet 118 transmission changes, the amount of energy used by the slave wireless device 102b to receive the packet 118 may remain the same.

The master wireless device 102a and the slave wireless device 102b may exchange timing uncertainty information 110 relating to a clock of the slave wireless device 102b and a clock of a master wireless device 102a. The timing uncertainty exchange module 108a of the master wireless device 102a may communicate with the timing uncertainty exchange module 108b of the slave wireless device 102b. The timing uncertainty information 110 may relate to clock drift of the slave wireless device 102b and the master wireless device 102a. For example, the timing uncertainty exchange module 108a of the master wireless device 102a may provide the timing uncertainty of the master clock 120. The timing uncertainty exchange module 108b of the slave wireless device 102b may provide the timing uncertainty of the slave clock 122. Therefore, the timing uncertainty information 110 may include the combined timing uncertainty of the master clock 120 and the slave clock 122. In one configuration, the slave wireless device 102b may provide the timing uncertainty of the slave clock 122 to the master wireless device 102a, but the master wireless device 102a does not provide the timing uncertainty of the master clock 120 to the slave wireless device 102b.

The packet transmission module 112 of the master wireless device 102a may transmit a packet 118 multiple times on the same frequency 116 based on the receive window 106 and the timing uncertainty information 110. The combined (e.g., master+slave) timing uncertainty may form a transmission window 115 in which the packet transmission module 112 may transmit a packet 118 multiple times. The transmission window 115 may be based on the total clock drift uncertainty of the two wireless devices 102.

The packet transmission module 112 may determine the number of packets to transmit 114 based on the combined timing uncertainty information 110 and the receive window 106. In one configuration, the packet transmission module 112 may divide the combined timing uncertainty by the size of a single packet 118 to determine the number of packets to transmit 114 in the transmission window 115.

The multiple packets 118a-n may include the same information (e.g., the same packet 118 may be repeated). Furthermore, the multiple packets 118a-n may be transmitted on the same frequency 116. In other words, the master wireless device 102a may not perform frequency hopping while transmitting the multiple packets 118a-n to the slave wireless device 102b.

The transmission of the multiple packets 118a-n may be centered on the nominal timing 126. When an even number of packets are transmitted 114, the packet transmission module 112 may transmit half of the packets 118a-n before the nominal timing 126 and half of the packets 118a-n after the nominal timing 126.

When an odd number of packets are transmitted 114, the packet transmission module 112 may center one packet 118 at the nominal timing 126. The packet transmission module 112 may transmit half of the remaining packets 118a-n before the nominal timing 126 and half of the remaining packets 118a-n after the nominal timing 126.

The slave wireless device 102b may wake at the nominal timing 126 and receive one of the multiple packets 118a-n. The slave wireless device 102b may wake during the receive window 106 and acquire a packet 118. The slave wireless device 102b may then go back to sleep (e.g., re-enter low duty cycle mode).

It should be noted that by having the master wireless device 102a compensate for the timing uncertainty of the master clock 120 and the slave clock 122, the amount of energy consumed by the slave wireless device 102b is reduced. Instead of the slave wireless device 102b opening a large receive window 106, the master wireless device 102a transmits multiple packets 118a-n during the period of uncertainty. Therefore, the slave wireless device 102b only has to listen for a short period of time to acquire a packet 118. While the timing uncertainty is the same (e.g., the combined timing uncertainty), the master wireless device 102a expends the energy to compensate for the timing uncertainty. For the slave wireless device 102b, the power consumption may be constant, independent of timing uncertainty and the time between low energy connection events.

Figure 2:
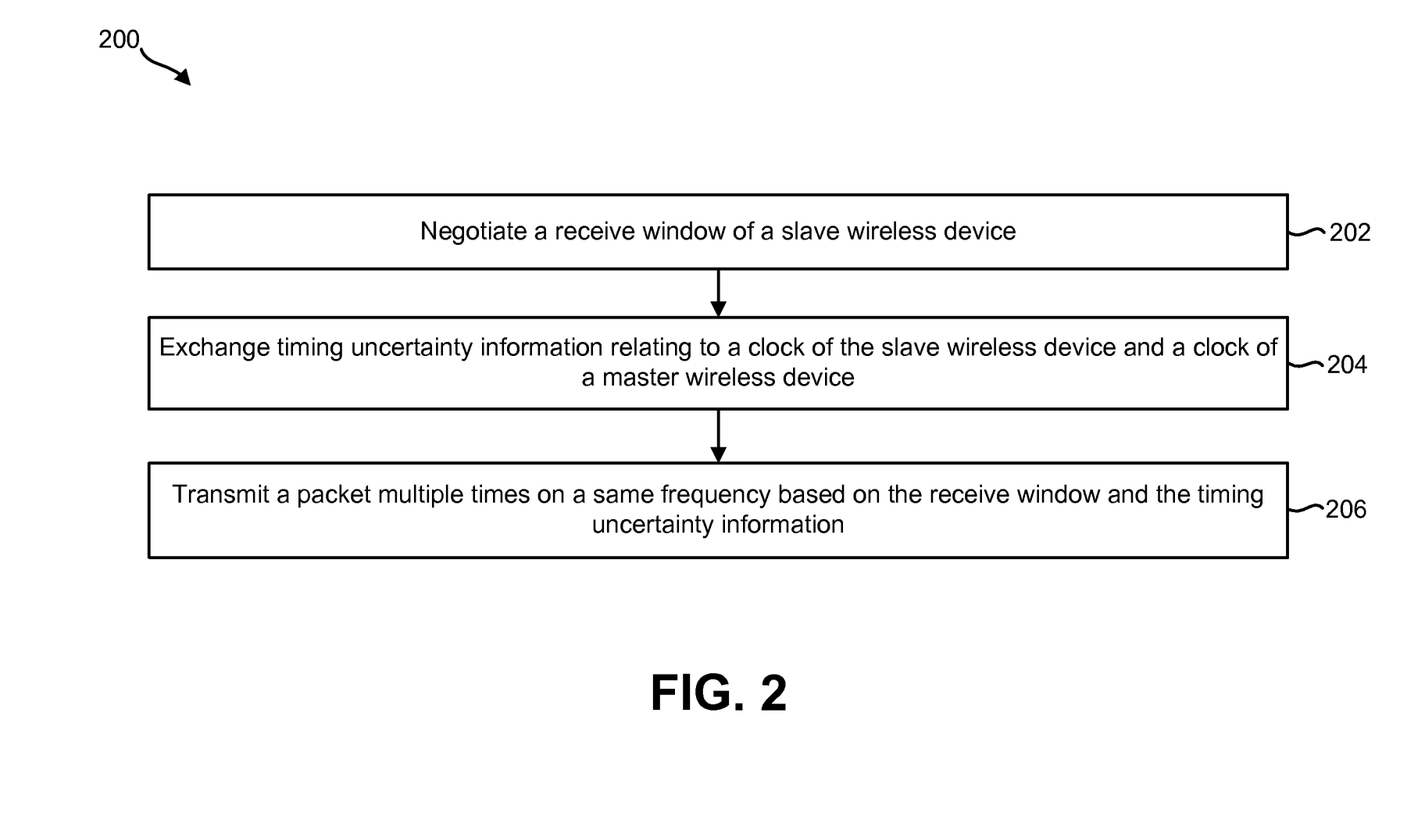
FIG. 2 is a flow diagram illustrating one configuration of a method for reducing power consumption.

FIG. 2 is a flow diagram illustrating one configuration of a method 200 for reducing power consumption. In one implementation, a master wireless device 102a may perform the method 200 illustrated in FIG. 2 in order to reduce power consumption by a slave wireless device 102b.

The master wireless device 102a may negotiate 202 the receive window 106 of the slave wireless device 102b. The receive window 106 may be determined based on the size of a packet 118 and nominal timing 126 for transmitting the packet 118. The receive window 106 of the slave wireless device 102b may be wide enough to receive the packet 118. The receive window 106 indicates when the slave wireless device 102b will wake up (e.g., enter a data mode) and how long the slave wireless device 102b will listen for a packet 118. The size of the receive window 106 may be large enough to ensure that the slave wireless device 102b receives a packet 118 transmission.

The master wireless device 102a may exchange 204 timing uncertainty information 110 relating to the clock of the slave wireless device 102b and the clock of a master wireless device 102a. For example, the master wireless device 102a may receive the timing uncertainty of the slave clock 122 from the slave wireless device 102b. The master wireless device 102a may send the timing uncertainty of the master clock 120 to the slave wireless device 102b. Alternatively, the master wireless device 102a may receive the timing uncertainty of the slave clock 122 from the slave wireless device 102b, but the master wireless device 102a does not send the timing uncertainty of the master clock 120 to the slave wireless device 102b.

The master wireless device 102a may transmit 206 a packet 118 multiple times on a same frequency 116 based on the receive window 106 and the timing uncertainty information 110. This may be accomplished as described above in connection with FIG. 1. For example, the master wireless device 102a may determine a transmission window 115 based on the combined timing uncertainty of the master clock 120 and the slave clock 122. The master wireless device 102a may determine the number of packets to transmit 114 based on the combined timing uncertainty information 110 and the receive window 106.

The master wireless device 102a may transmit 206 the same packet 118 multiple times. In other words, the multiple packets 118a-n may include the same information (e.g., the same packet 118 may be repeated).

The master wireless device 102a may transmit 206 the multiple packets 118a-n on the same frequency 116. In one configuration, the master wireless device 102a may not perform frequency hopping while transmitting the multiple packets 118a-n to the slave wireless device 102b.

Figure 3:
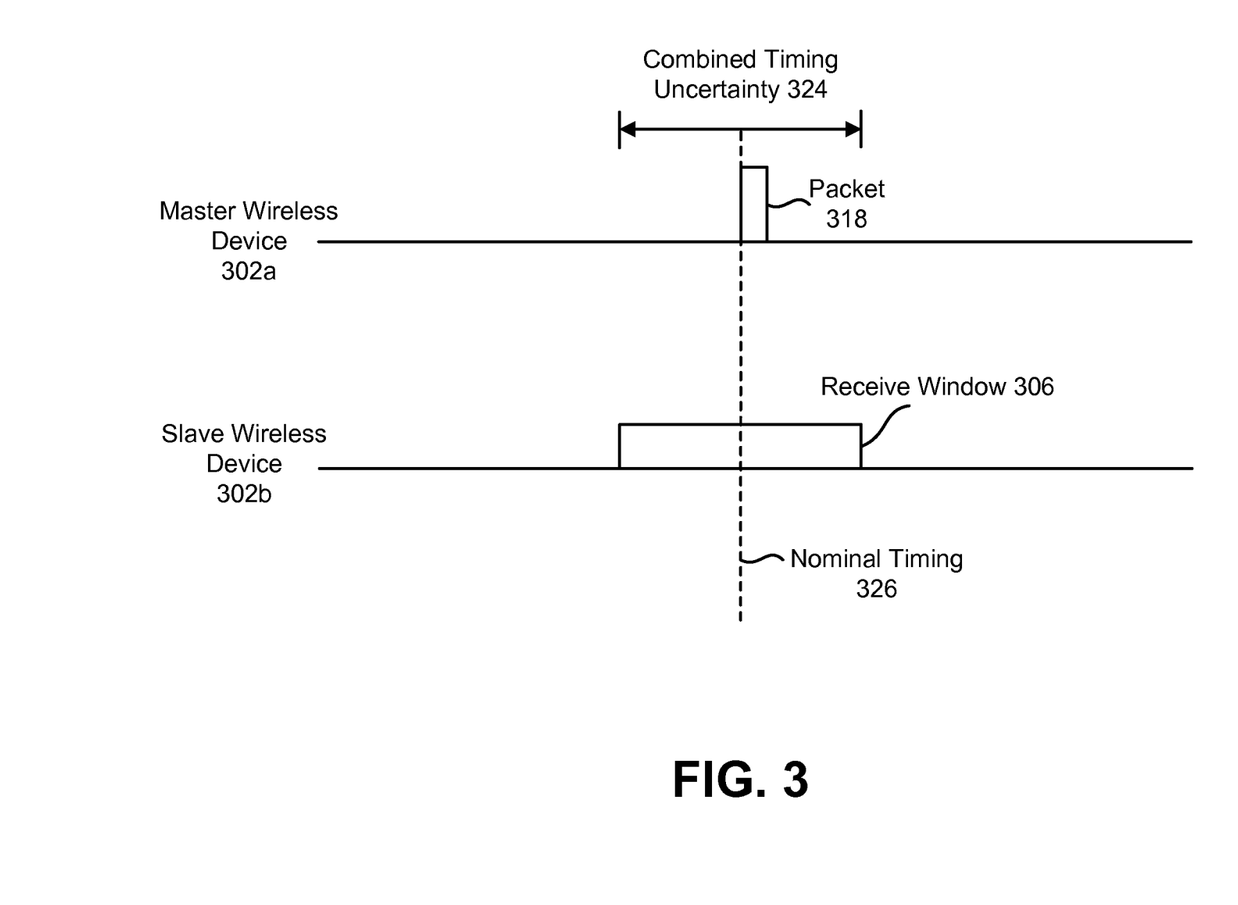
FIG. 3 is a block diagram illustrating one configuration of packet transmission between a master wireless device and a slave wireless device.

FIG. 3 is a block diagram illustrating one configuration of packet 318 transmission between a master wireless device 302a and a slave wireless device 302b. The master wireless device 302a and the slave wireless device 302b may operate in a time division duplex system with a polled multiple access scheme. FIG. 3 illustrates packet 318 transmission according to a known solution (e.g., Bluetooth Low Energy specification (v4.0)).

To facilitate low duty cycle operation, the master wireless device 302a and the slave wireless device 302b may negotiate that they will be absent for a certain amount of time. The wireless devices 302 may perform low energy connection events based on a nominal timing 326 to maintain synchronization. The master wireless device 302a and the slave wireless device 302b may negotiate the nominal timing 326. At the nominal timing 326, the master wireless device 302a may transmit a packet 318 to the slave wireless device 302b. The master wireless device 302a, the slave wireless device 302b or both may then enter a low duty cycle mode (e.g., sleep mode). Furthermore, at the designated time, the slave wireless device 302b may wake and receive the packet 318. The master wireless device 302a may transmit the packet 318 once at the nominal timing 326.

According to the known approach, the slave wireless device 302b compensates for timing uncertainties in the master clock 120 and the slave clock 122. The master wireless device 302a and the slave wireless device 302b may exchange timing uncertainty information 110. The slave wireless device 302b then determines the size of a slave receive window 306 based on the combined timing uncertainty 324 of the master clock 120 and the slave clock 122. This may be accomplished as described above in connection with FIG. 1.

It should be noted that from the perspective of the slave wireless device 302b, the packet transmission could occur anywhere within the window of the combined timing uncertainty 324. The slave wireless device 302b opens a receive window 306 that is wider than the packet 318 to compensate for the combined timing uncertainty 324 of the master clock 120 and the slave clock 122. The slave wireless device 302b starts listening for the packet 318 early (e.g., before the master wireless device 302a sends the packet 318). The slave wireless device 302b will then continue to listen for the packet 318 for the duration of the receive window 306 because the slave wireless device 302b does not know precisely when the packet 318 will be sent relative to the nominal timing 326 due to the timing uncertainties.

The slave wireless device 302b can compensate for timing uncertainty, but the consequence is power consumption. Because the slave wireless device 302b opens up a wider receive window 306, the slave wireless device 302b must consume more power than if the timing was perfect. Furthermore, as timing uncertainty increases, the amount of power consumption that the slave wireless device 302b has to expend in order to compensate for the timing uncertainty increases.

Figure 4:
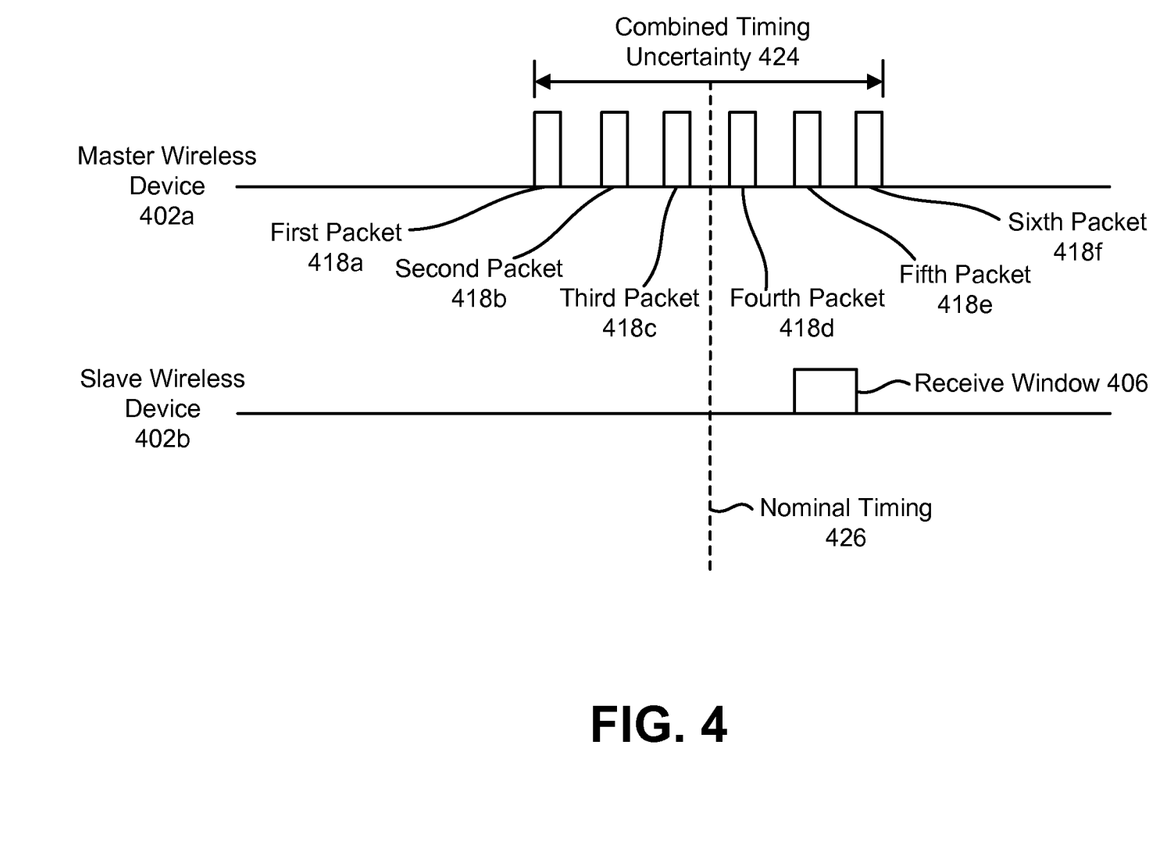
FIG. 4 is a block diagram illustrating one configuration of packet transmission between a master wireless device and a slave wireless device according to the described systems and methods.

FIG. 4 is a block diagram illustrating one configuration of packet 418 transmission between a master wireless device 402a and a slave wireless device 402b according to the described systems and methods. The master wireless device 402a and the slave wireless device 402b may operate in a time division duplex system with a polled multiple access scheme.

To facilitate low duty cycle operation, the master wireless device 402a and the slave wireless device 402b may negotiate that they will be absent for a certain amount of time. The wireless devices 402 may perform low energy connection events based on a nominal timing 426 to maintain synchronization. The master wireless device 402a and the slave wireless device 402b may negotiate the nominal timing 426. However, the master wireless device 402a may compensate for timing uncertainty.

In one configuration, the master wireless device 402a and the slave wireless device 402b may negotiate the receive window 406 for the slave wireless device 402b. The receive window 406 may be determined based on the size of the packet 418 and the nominal timing 426. The receive window 406 of the slave wireless device 402b may be wide enough to receive the packet 418. The receive window 406 indicates when the slave wireless device 402b will wake up (e.g., enter a data mode of operation) and how long the slave wireless device 402b will listen for a packet 418.

The master wireless device 402a may transmit multiple packets 418a-f based on combined timing uncertainty 424 of the master clock 120 and the slave clock 122. The master wireless device 402a and the slave wireless device 402b may exchange timing uncertainty information 110 associated with the master clock 120 and the slave clock 122. The master wireless device 402a may then determine a transmission window 115 based on the combined timing uncertainty 424 of the master clock 120 and the slave clock 122. The master wireless device 402a may transmit multiple packets 418a-f within the transmission window 115 of the combined timing uncertainty 424.

In the example illustrated in FIG. 4, six packets 418a-f are transmitted. The packet 418 transmission is centered on the nominal timing 426. The master wireless device 402a transmits four packets 418a-d that are not received by the slave wireless device 402b. However, based on the negotiated receive window 406, the slave wireless device 402b wakes up and receives the fifth packet 418e. It should be noted that the number of packets 418 may vary from the number provided in the example illustrated in FIG. 4.

The slave wireless device 402b may open a receive window 406 only as wide as the pre-negotiated time between packet 418 transmissions from the master wireless device 402a. Therefore, the width of the receive window 406 may correspond to the time it takes the master wireless device 502a to transmit two consecutive packets 418.

In another configuration, the master wireless device 402a may dynamically determine how many times to transmit the packet 418 so that the slave wireless device 402b will receive the packet 418 at least once. The master wireless device 402a may perform an uncertainty calibration. For example, the master wireless device 402a may discover that the slave wireless device 402b is always responding in response to a certain packet transmission. Therefore, the master wireless device 402a may dynamically determine where in the combined timing uncertainty 424 window (e.g., the transmission window 115) the slave wireless device 402b is receiving the packet 418. Based on this uncertainty calibration, the master wireless device 402a may not have to transfer all of the packets 418.

It should be noted that the power consumption on the slave wireless device 402b side is constant independent of the time between low energy connection events. Furthermore, when the time between low energy connection events is small enough, the master wireless device 402a may only transmit one packet 418 and the slave wireless device 402b can scale the receive window 406 based on the timing inaccuracy.

Figure 5:
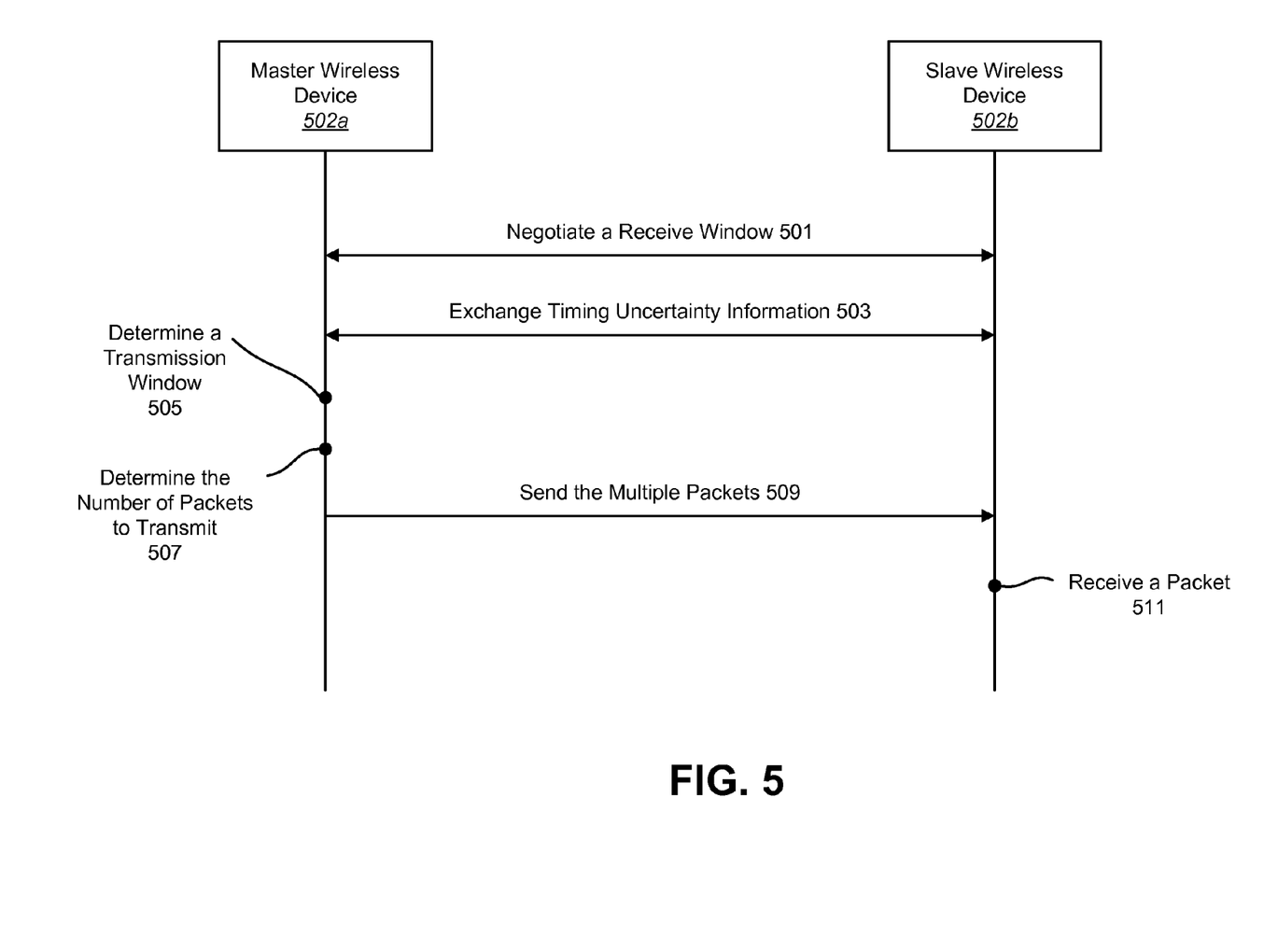
FIG. 5 is a thread diagram illustrating one configuration for reducing power consumption.

FIG. 5 is a thread diagram illustrating one configuration for reducing power consumption. In particular, FIG. 5 illustrates the timing between a master wireless device 502a and a slave wireless device 502b. The master wireless device 502a and the slave wireless device 502b may operate in a time division duplex system with a polled multiple access scheme, as described above in connection with FIG. 1. The master wireless device 502a and the slave wireless device 502b may enter a low energy connection cycle in which the master wireless device 502a and the slave wireless device 502b may be out of contact for a certain amount of time. The slave wireless device 502b may enter a low duty cycle mode between low energy connection events.

The master wireless device 502a and the slave wireless device 502b may negotiate 501 a receive window 106 of the slave wireless device 502b. The receive window 106 may be determined based on the size of a packet 118 and nominal timing 126 for transmitting the packet 118. The receive window 106 indicates when the slave wireless device 502b will wake up (e.g., enter a data mode) and how long the slave wireless device 502b will listen for a packet 118. In one configuration, the slave wireless device 502b may cap the size of the receive window 106 at a certain amount (e.g., 1 ms)

The master wireless device 502a and the slave wireless device 502b may exchange 503 timing uncertainty information 110 relating to the master clock 120 and the slave clock 122. For example, the timing uncertainty information 110 may indicate the amount of clock drift for the master clock 120 and the slave clock 122.

The master wireless device 502a may determine 505 a transmission window 115 based on the combined timing uncertainty 424 of the master clock 120 and the slave clock 122. The transmission window 115 may have a width corresponding to the combined timing uncertainty 424. The transmission window 115 may be centered at the nominal timing 126.

The master wireless device 502a may determine 507 the number of packets to transmit 114. In one configuration, the master wireless device 502a may determine 507 the number of packets to transmit 114 based on the size of the transmission window 115 and the receive window 106. For example, the master wireless device 502a may divide the transmission window 115 by the receive window 106 to determine the number of packets 118 that may be sent without overlapping.

The master wireless device 502a may send 509 multiple packets 118 to the slave wireless device 502b. The master wireless device 502a may send 509 a packet 118 at the beginning of the transmission window 115. The master wireless device 502a may repeat sending 509 the packet 118 over the course of the transmission window 115.

The slave wireless device 502b may receive 511 a packet 118. At the pre-negotiated time of the receive window 106, the slave wireless device 502b may exit the low duty cycle mode and may enter a data mode. The slave wireless device 502b may receive one of the packets 118 transmitted by the slave wireless device 502b.

Figure 6:
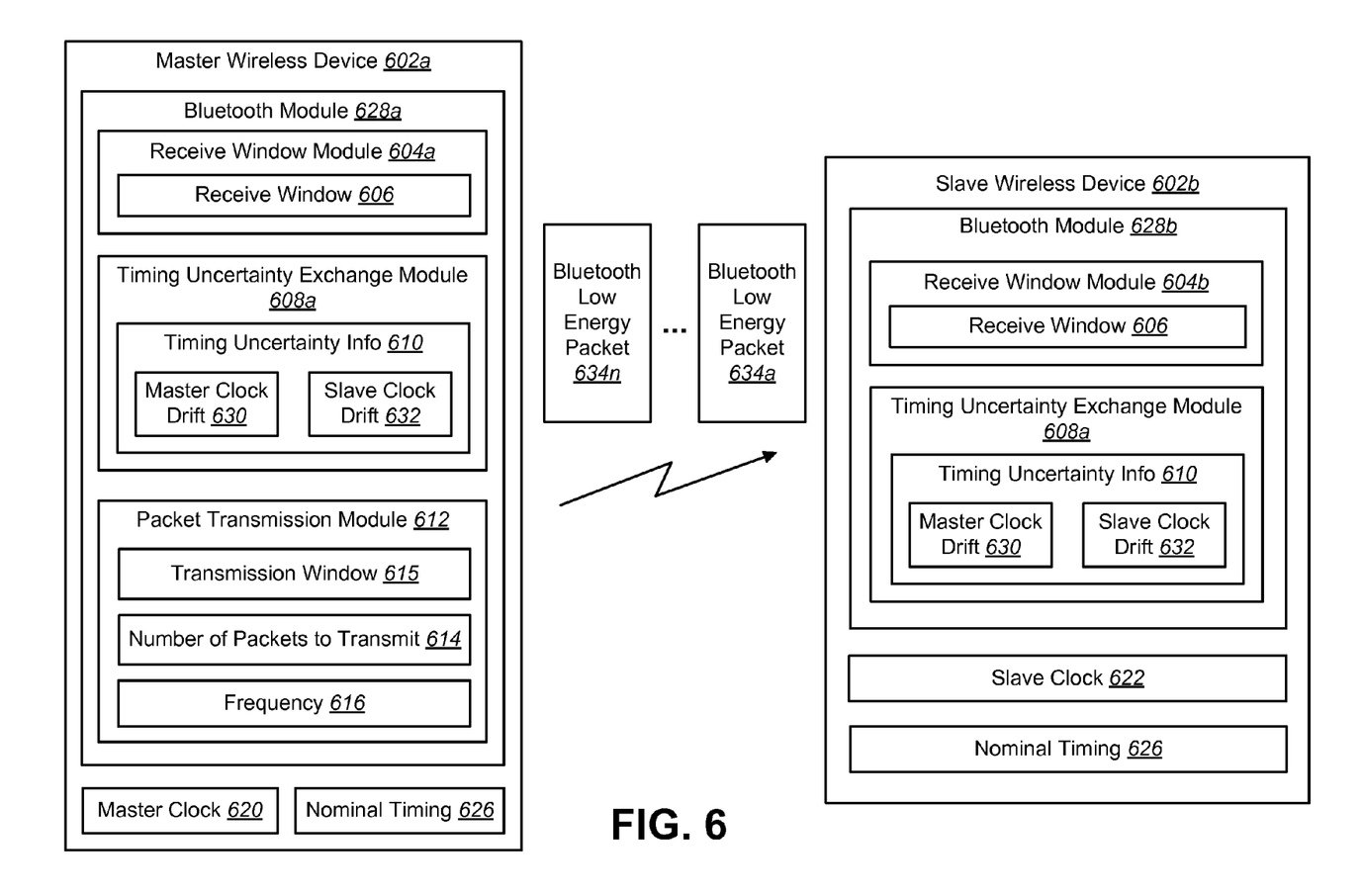
FIG. 6 is a block diagram illustrating a more detailed configuration of a master wireless device and a slave wireless device in which systems and methods for reducing power consumption may be implemented.

FIG. 6 is a block diagram illustrating a more detailed configuration of a master wireless device 602a and a slave wireless device 602b in which systems and methods for reducing power consumption may be implemented. The master wireless device 602a may include a Bluetooth module 628a. The slave wireless device 602b may also include a Bluetooth module 628b. The Bluetooth modules 628 may establish a wireless link between the master wireless device 602a and the slave wireless device 602b according to the Bluetooth wireless technology standard. The Bluetooth module 628 may operate according to classic Bluetooth or low energy Bluetooth standards. For example, the Bluetooth module 628a of the master wireless device 602a may transmit Bluetooth low energy packets 634.

The master wireless device 602a may include a receive window module 604a. The slave wireless device 602b may also include a receive window module 604b. The master wireless device 602a and the slave wireless device 602b may negotiate the receive window 606 of the slave wireless device 602b. This may be accomplished as described in connection with FIG. 1. The size of the receive window 606 may be large enough to ensure that the slave wireless device 602b receives a Bluetooth low energy packet 634 transmission from the master wireless device 602a.

The master wireless device 602a and the slave wireless device 602b may exchange timing uncertainty information 610 relating to a clock of the slave wireless device 602b and a clock of a master wireless device 602a. The timing uncertainty exchange module 608a of the master wireless device 602a may transmit the master clock drift 630 to the slave wireless device 602b. The master clock drift 630 may indicate the amount that the master clock 620 may drift over time. The timing uncertainty exchange module 608b of the slave wireless device 602b may transmit the slave clock drift 630 to the master wireless device 602a. The slave clock drift 630 may indicate the amount that the slave clock 622 may drift over time.

The packet transmission module 612 of the master wireless device 602a may determine a transmission window 615 based on the timing uncertainty information 610 and the nominal timing 626. The combined master clock drift 630 and the slave clock drift 632 may define the width of the transmission window 615. The transmission window 615 may be centered at the nominal timing 626.

The packet transmission module 612 may determine the number of packets to transmit 614 based on the combined timing uncertainty information 610 and the receive window 606. This may be accomplished as described above in connection with FIG. 1.

The packet transmission module 612 may transmit the Bluetooth low energy packet 634 multiple times within the transmission window 615. The multiple Bluetooth low energy packets 634a-n may include the same information (e.g., the same Bluetooth low energy packet 634 may be repeated). Furthermore, the multiple Bluetooth low energy packets 634a-n may be transmitted on the same frequency 616. In other words, the master wireless device 602a may not perform frequency hopping while transmitting the multiple Bluetooth low energy packets 634a-n to the slave wireless device 602b.

The slave wireless device 602b may wake and receive one of the multiple Bluetooth low energy packets 634a-n. The slave wireless device 602b may exit a low duty cycle mode and enter a data mode. The slave wireless device 602b may open the negotiated receive window 606 and acquire a Bluetooth low energy packet 634. The slave wireless device 602b may then go back to sleep (e.g., re-enter low duty cycle mode).

Figure 7:
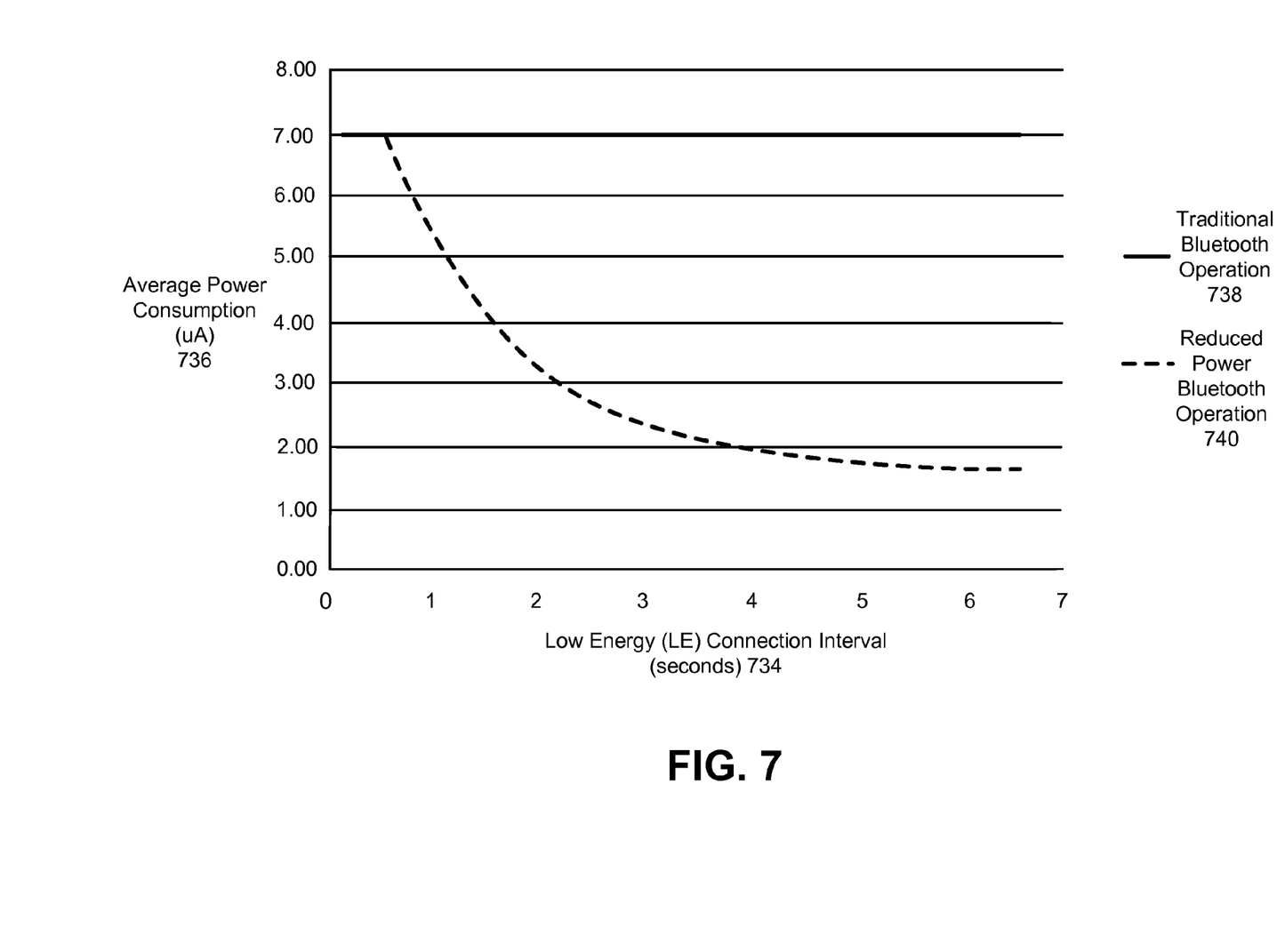
FIG. 7 is a graph illustrating power consumption by a slave wireless device for various low energy (LE) connection intervals.

FIG. 7 is a graph illustrating power consumption by a slave wireless device 102b for various low energy (LE) connection intervals 734. In simulations, the maximum receive window 106 for a slave wireless device 102b was 1.25 ms. The average power consumption 736 for traditional Bluetooth operation 738 and reduced power Bluetooth operation 740 are compared for various LE connection intervals 734.

The LE connection intervals 734 represent the amount of time between a Bluetooth LE connection event. In traditional Bluetooth operation 738, the slave wireless device 102b performs timing uncertainty compensation. In reduced power Bluetooth operation 740, a master wireless device 102a performs timing uncertainty compensation, as described in connection with FIG. 1. The average power consumption 736 was measured in microamps (uA) and the LE connection interval 734 was measured in seconds.

The power consumption for traditional Bluetooth operation 738 stays at a constant 7 uA for the various LE connection intervals 734 due to the linear nature of the timing uncertainty. In other words, the timing uncertainty changes linearly with the LE connection interval 734, resulting in a constant power consumption for different LE connection intervals 734.

For reduced power Bluetooth operation 740 above a certain LE connection interval 734, the receive window 106 of the slave wireless device 102b will be a constant width, which will directly minimize the power consumption in that mode of operation. If the LE connection interval 734 is between 0 and 1 second, then the power consumption of slave wireless device 102b is the same (e.g., 7 uA) as traditional Bluetooth operation 738. However, the slave wireless device 102b power consumption drops dramatically for LE connection intervals 734 between one and three seconds, with the majority of the power consumption reduction occurring at two seconds. As illustrated in FIG. 7, the power consumption benefits for the slave wireless device 102b are experienced relatively quickly.

Figure 8:
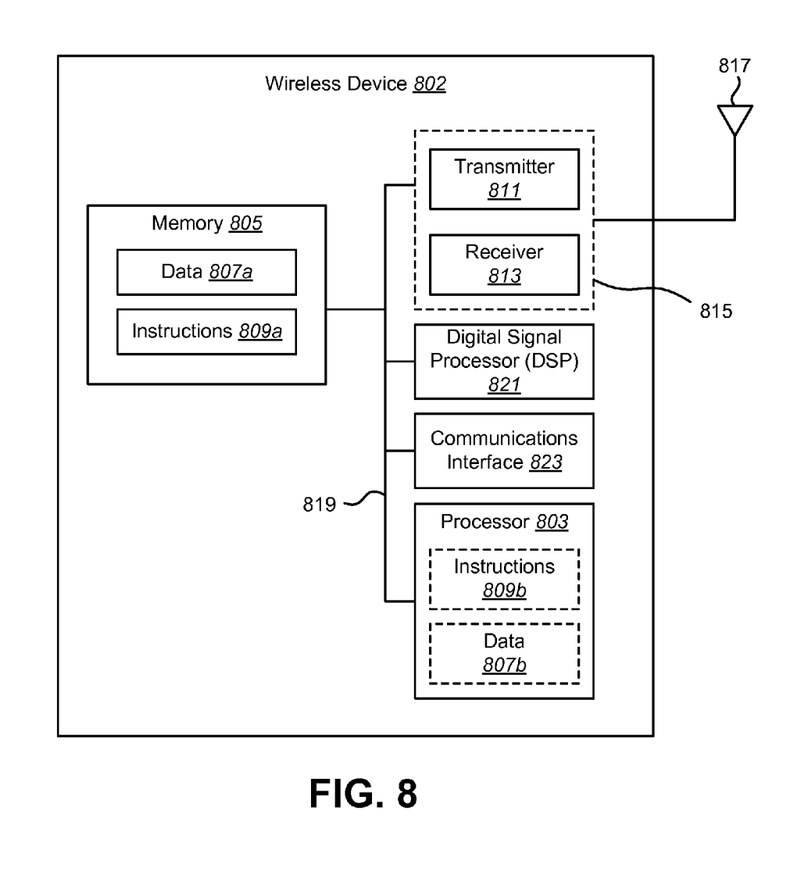
FIG. 8 illustrates certain components that may be included within a wireless device.

FIG. 8 illustrates certain components that may be included within a wireless device 802. The wireless device 802 may be an access terminal, a mobile station, a user equipment (UE), a laptop computer, a desktop computer, a wireless headset, etc. For example, the wireless device 802 may be a wireless device 102 of FIG. 1 or the wireless device 602 of FIG. 6.

The wireless device 802 includes a processor 803. The processor 803 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the wireless device 802 of FIG. 8, in an alternative configuration, a combination of processors (e.g., an ARM and DSP) could be used.

The wireless device 802 also includes memory 805 in electronic communication with the processor (i.e., the processor can read information from and/or write information to the memory). The memory 805 may be any electronic component capable of storing electronic information. The memory 805 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions may include one or more programs, routines, sub-routines, functions, procedures, code, etc. The instructions may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The wireless device 802 may also include a transmitter 811 and a receiver 813 to allow transmission and reception of signals to and from the wireless device 802 via an antenna 817. The transmitter 811 and receiver 813 may be collectively referred to as a transceiver 815. The wireless device 802 may also include (not shown) multiple transmitters, multiple antennas, multiple receivers and/or multiple transceivers.

The wireless device 802 may include a digital signal processor (DSP) 821. The wireless device 802 may also include a communications interface 823. The communications interface 823 may allow a user to interact with the wireless device 802.

The various components of the wireless device 802 may be coupled together by one or more buses, which may include a power bus, a control signal bus, a status signal bus, a data bus, etc. For the sake of clarity, the various buses are illustrated in FIG. 8 as a bus system 819.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing power consumption, wherein the method is performed by a master wireless device, comprising:
   negotiating a receive window length of a slave wireless device;
   receiving, at the master wireless device, timing uncertainty information relating to a clock of the slave wireless device;
   determining a width of a transmission window of the master wireless device, wherein the transmission window corresponds to a single receive window of the slave wireless device and the width of the transmission window corresponds to a combined timing uncertainty of the master wireless device and the slave wireless device;
   determining a number of packets to transmit within the transmission window based on the combined timing uncertainty and the negotiated receive window length, wherein the number of packets is greater than one, wherein the packets include the same information; and
   transmitting the number of packets, within the transmission window and on a same frequency, for the single receive window of the slave wireless device.

2. The method of claim 1, wherein the packets are Bluetooth Low Energy packets.

3. The method of claim 1, wherein the master wireless device operates in a time division duplex system with a polled multiple access scheme.

4. The method of claim 1, wherein the timing uncertainty information relates to clock drift of the slave wireless device and the master wireless device.

5. The method of claim 1, wherein the receive window length is a maximum time the slave wireless device must remain awake to receive at least one of the packets.

6. The method of claim 1, wherein the determining the number of packets to transmit comprises dynamically determining how many packets to transmit so that the slave wireless device will receive at least one of the packets.

7. A master wireless device for reducing power consumption, comprising:
   a processor;
   memory in electronic communication with the processor; and
   instructions stored in the memory, the instructions being executable by the processor to:
   negotiate a receive window length of a slave wireless device;
   receive, at the master wireless device, timing uncertainty information relating to a clock of the slave wireless device;
   determine a width of a transmission window of the master wireless device, wherein the transmission window corresponds to a single receive window of the slave wireless device and the width of the transmission window corresponds to a combined timing uncertainty of the master wireless device and the slave wireless device;
   determine a number of packets to transmit within the transmission window based on the combined timing uncertainty and the negotiated receive window length, wherein the number of packets is greater than one, wherein the packets include the same information; and transmit the number of packets, within the transmission window and on a same frequency, for a single receive window of the slave wireless device.

8. The master wireless device of claim 7, wherein the packets are Bluetooth Low Energy packets.

9. The master wireless device of claim 7, wherein the master wireless device operates in a time division duplex system with a polled multiple access scheme.

10. The master wireless device of claim 7, wherein the timing uncertainty information relates to clock drift of the slave wireless device and the master wireless device.

11. The master wireless device of claim 7, wherein the receive window length is a maximum time the slave wireless device must remain awake to receive at least one of the packets.

12. The master wireless device of claim 7, wherein the instructions executable to determine the number of packets to transmit comprise instructions executable to dynamically determine how many packets to transmit so that the slave wireless device will receive at least one of the packets.

13. A master wireless device for reducing power consumption, comprising:

means for negotiating a receive window length of a slave wireless device;

means for receiving, at the master wireless device, timing uncertainty information relating to a clock of the slave wireless device;

means for determining a width of a transmission window of the master wireless device wherein the transmission window corresponds to a single receive window of the slave wireless device and the width of the transmission window corresponds to a combined timing uncertainty of the master wireless device and the slave wireless device;

means for determining a number of packets to transmit within the transmission window based on the combined timing uncertainty and the negotiated receive window length, wherein the number of packets is greater than one, wherein the packets include the same information; and means for transmitting the number of packets, within the transmission window and on a same frequency, for a single receive window of the slave wireless device.

14. The master wireless device of claim 13, wherein the packets are Bluetooth Low Energy packets.

15. The master wireless device of claim 13, wherein the master wireless device operates in a time division duplex system with a polled multiple access scheme.

16. The master wireless device of claim 13, wherein the timing uncertainty information relates to clock drift of the slave wireless device and the master wireless device.

17. The master wireless device of claim 13, wherein the receive window length is a maximum time the slave wireless device must remain awake to receive at least one of the packets.

18. The master wireless device of claim 13, wherein the means for determining the number of packets to transmit comprise means for dynamically determining how many packets to transmit so that the slave wireless device will receive at least one of the packets.

19. A non-transitory computer-readable medium having instructions thereon, the instructions comprising:

code for causing a master wireless device to negotiate a receive window length of a slave wireless device;

code for causing the master wireless device to receive, at the master wireless device, timing uncertainty information relating to a clock of the slave wireless device;

code for causing the master wireless device to determine a width of a transmission window of the master wireless device, wherein the transmission window corresponds to a single receive window of the slave wireless device and the width of the transmission window corresponds to a combined timing uncertainty of the master wireless device and the slave wireless device;

code for causing the master wireless device to determine a number of packets to transmit within the transmission window based on the combined timing uncertainty and the negotiated receive window length, wherein the number of packets is greater than one, wherein the packets include the same information; and code for causing the master wireless device to transmit the number of packets, within the transmission window and on a same frequency, for a single receive window of the slave wireless device.

20. The non-transitory computer-readable medium of claim 19, wherein the packets are Bluetooth Low Energy packets.

21. The non-transitory computer-readable medium of claim 19, wherein the master wireless device operates in a time division duplex system with a polled multiple access scheme.

22. The non-transitory computer-readable medium of claim 19, wherein the timing uncertainty information relates to clock drift of the slave wireless device and the master wireless device.

23. The non-transitory computer-readable medium of claim 19, wherein the receive window length is a maximum time the slave wireless device must remain awake to receive at least one of the packets.

24. The non-transitory computer-readable medium of claim 19, wherein the code for causing the master wireless device to determine the number of packets comprises code for causing the master wireless device to dynamically determine how many packets to transmit so that the slave wireless device will receive at least one of the packets.

* * * * *